United States Patent

Son

(10) Patent No.: US 9,952,404 B2
(45) Date of Patent: Apr. 24, 2018

(54) OPTICAL SYSTEM

(71) Applicant: Samsung Electro-Mechanics Co., Ltd., Suwon-si (KR)

(72) Inventor: Ju Hwa Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/951,945

(22) Filed: Nov. 25, 2015

(65) Prior Publication Data

US 2016/0161719 A1    Jun. 9, 2016

(30) Foreign Application Priority Data

Dec. 5, 2014  (KR) ........................ 10-2014-0174342

(51) Int. Cl.
  *G02B 9/62*  (2006.01)
  *G02B 13/00*  (2006.01)

(52) U.S. Cl.
  CPC ........... *G02B 9/62* (2013.01); *G02B 13/0045* (2013.01)

(58) Field of Classification Search
  CPC ........ G02B 9/62; G02B 9/64; G02B 13/0045; G02B 9/60; G02B 13/04
  USPC ........ 359/708, 713, 749–753, 755, 761, 770
  See application file for complete search history.

(56) References Cited

U.S. PATENT DOCUMENTS

| 7,564,634 B2 | 7/2009 | Lin et al. | |
| 8,599,495 B1* | 12/2013 | Tsai | G02B 13/0045 359/708 |
| 8,908,290 B1* | 12/2014 | Liao | G02B 13/0045 359/715 |
| 2014/0009844 A1 | 1/2014 | Tsai et al. | |
| 2014/0043694 A1* | 2/2014 | Tsai | G02B 3/04 359/708 |
| 2014/0092491 A1* | 4/2014 | Hsu | G02B 9/62 359/761 |
| 2015/0054994 A1* | 2/2015 | Tsai | G02B 3/04 348/294 |
| 2015/0212296 A1* | 7/2015 | Huang | G02B 13/0045 348/335 |
| 2016/0259150 A1* | 9/2016 | Shin | G02B 27/0025 |
| 2016/0282588 A1* | 9/2016 | Sekine | G02B 9/62 |
| 2016/0306140 A1* | 10/2016 | Chen | G02B 9/64 |

FOREIGN PATENT DOCUMENTS

JP   2011-227362 A   11/2011
JP   2014-44250 A    3/2014

* cited by examiner

*Primary Examiner* — Jordan Schwartz
(74) *Attorney, Agent, or Firm* — NSIP Law

(57) ABSTRACT

An optical system includes: a first lens having negative refractive power; a second lens; a third lens; a fourth lens; a fifth lens; a sixth lens; and an image sensor configured to convert an image of a subject incident through the first to sixth lenses into electrical signals, wherein the first to sixth lenses are sequentially disposed from an object side of the optical system, and wherein TTL/(ImgH*2)≤0.75 is satisfied, with TTL being a distance from an object-side surface of the first lens to an image plane of the image sensor and ImgH being half of a diagonal length of the image plane of the image sensor.

13 Claims, 15 Drawing Sheets

| FIRST EMBODIMENT | RADIUS OF CURVATURE | THICKNESS | REFRACTIVE INDEX | ABBE NUMBER | EFFECTIVE RADIUS |
|---|---|---|---|---|---|
| S1 | 1.6766441 | 0.25 | 1.658 | 21.494 | 0.9492135 |
| S2 | 1.4102744 | 0.06 | | | 0.9363019 |
| S3 | 1.5390238 | 0.5855063 | 1.5465 | 56.113 | 0.9590545 |
| S4 | -34.27121 | 0.04 | | | 0.94 |
| S5 | 5.7248317 | 0.25 | 1.658 | 21.494 | 0.9594572 |
| S6 | 2.772828 | 0.4818231 | | | 0.9697204 |
| S7 | -5.611784 | 0.3874789 | 1.658 | 21.494 | 1.0106588 |
| S8 | -6.150525 | 0.3880746 | | | 1.263179 |
| S9 | -4.249388 | 0.7500116 | 1.5465 | 56.113 | 1.5592703 |
| S10 | -1.473491 | 0.2658984 | | | 1.9242535 |
| S11 | 10.698131 | 0.6517418 | 1.536 | 55.656 | 2.6591115 |
| S12 | 1.3305123 | 0.3 | | | 3.0820031 |
| S13 | Infinity | 0.21 | | | 3.3525807 |
| S14 | Infinity | | | | 3.4061042 |
| Image | Infinity | | | | 3.6810401 |

FIG. 4

| | S1 | S2 | S3 | S4 | S5 | S6 | S7 | S8 | S9 | S10 | S11 | S12 |
|---|---|---|---|---|---|---|---|---|---|---|---|---|
| K | -1.311627E+00 | 1.154753E+00 | -1.335532E+00 | -7.498103E+00 | 2.279365E+03 | 7.558111E+01 | 4.993402E+00 | 1.885017E+00 | 6.045887E+01 | -5.338634E+01 | -7.926083E+00 | -5.298837E+00 |
| A | -9.491152E-03 | -2.796523E-03 | 1.833456E-02 | -7.493349E-02 | 1.031034E-02 | -3.582759E-02 | -1.103301E-01 | -6.428845E-01 | 1.713355E-01 | 1.007124E-01 | -9.590091E-01 | -1.502296E-01 |
| B | -1.329522E-02 | -4.031602E-02 | -7.852111E-03 | 1.959985E-01 | 2.047881E-01 | 7.959987E-01 | -2.023745E-02 | -3.236894E-02 | 6.933293E-02 | 4.399898E-02 | 3.463863E-01 | 1.982933E-01 |
| C | 1.260877E-02 | 6.015196E-02 | -2.985911E-02 | -2.889870E-01 | -2.267289E-01 | -2.763855E-01 | -9.212699E-02 | 2.577755E-01 | -4.810505E-03 | -3.662882E-03 | -9.885635E-03 | -7.116322E-02 |
| D | -3.991929E-02 | -2.901040E-02 | 2.124204E-01 | 2.024738E-01 | 5.574761E-01 | 6.429532E-02 | 3.786728E-01 | 9.103219E-02 | -1.568541E-02 | -1.339460E-02 | 1.981147E-02 | 2.872235E-02 |
| E | 4.492983E-02 | 8.211161E-02 | -4.189129E-01 | 1.134878E-01 | 2.455760E-01 | 1.189560E-01 | -6.425661E-02 | -1.198005E-01 | -1.668697E-01 | 6.333945E-03 | -2.107692E-03 | -9.084011E-03 |
| F | -3.501672E-02 | 8.363473E-02 | 3.649560E-01 | -2.766125E-01 | -3.418846E-01 | 1.490574E-01 | 5.311926E-01 | 7.234495E-01 | -3.134327E-02 | 6.309711E-06 | | 4.014184E-03 |
| G | 1.221222E-02 | -2.292022E-02 | -2.341894E-01 | 1.010434E-01 | 1.288830E-01 | -1.186605E-01 | -1.671382E-01 | -1.657926E-01 | -1.227847E-02 | -4.906376E-03 | | -1.145511E-03 |
| H | | | | | | | | | | 2.574137E-04 | | 4.884634E-04 |
| J | | | | | | | | | | 2.571703E-04 | | -2.004459E-04 |

FIG. 5

| SECOND EMBODIMENT | RADIUS OF CURVATURE | THICKNESS | REFRACTIVE INDEX | ABBE NUMBER | EFFECTIVE RADIUS |
|---|---|---|---|---|---|
| S1 | 1.6615778 | 0.25 | 1.658 | 21.494 | 0.9492135 |
| S2 | 1.38787 | 0.06 | | | 0.9062351 |
| S3 | 1.4753431 | 0.5485849 | 1.5465 | 56.113 | 0.9062539 |
| S4 | -178.5874 | 0.04 | | | 0.86 |
| S5 | 5.4017341 | 0.2628572 | 1.658 | 21.494 | 0.887356 |
| S6 | 2.6882851 | 0.4761579 | | | 0.9156739 |
| S7 | -5.233873 | 0.3438416 | 1.658 | 21.494 | 0.9793557 |
| S8 | -5.620497 | 0.366835 | | | 1.2124747 |
| S9 | -3.851383 | 0.7923213 | 1.5465 | 56.113 | 1.6093658 |
| S10 | -1.499429 | 0.1927239 | | | 1.9392463 |
| S11 | 8.0588619 | 0.774741 | 1.536 | 55.656 | 2.5956863 |
| S12 | 1.3564989 | 0.3519371 | | | 3.0855009 |
| S13 | Infinity | 0.21 | | | 3.3668243 |
| S14 | Infinity | | | | 3.419836 |
| Image | Infinity | | | | 3.6784498 |

FIG. 9

| | S1 | S2 | S3 | S4 | S5 | S6 | S7 | S8 | S9 | S10 | S11 | S12 |
|---|---|---|---|---|---|---|---|---|---|---|---|---|
| K | -1.236259E+00 | -1.128228E+00 | -1.305194E+00 | -7.498105E+00 | 2.295812E+00 | 1.631894E+01 | 4.993403E+00 | 1.608007E+00 | 3.861918E-03 | 5.334467E-01 | -7.916853E+00 | -5.057022E+00 |
| A | -1.418159E-02 | -2.726357E-02 | 1.409473E-02 | -1.058331E-02 | -2.051866E-02 | 1.623484E-02 | -1.130361E-02 | -1.202134E-01 | 2.186282E-01 | 2.573662E-01 | -9.833493E-01 | -1.469021E+00 |
| B | -2.501836E-03 | -2.326167E-03 | 1.459930E-03 | 2.518852E-03 | 1.811955E-03 | 6.824352E-03 | 3.654680E-03 | 2.738035E-02 | 3.954696E-02 | 8.309316E-02 | 3.477405E-02 | 2.002249E-01 |
| C | -3.522891E-04 | -5.880524E-04 | -3.854099E-04 | -6.543844E-04 | -2.007698E-03 | 3.034708E-03 | 2.037387E-03 | 8.785598E-03 | -1.142917E-02 | -1.780786E-02 | -9.870790E-02 | -7.144642E-02 |
| D | -1.793436E-05 | -1.320896E-04 | -2.149157E-04 | -1.201121E-04 | -3.885179E-04 | -3.973033E-04 | 4.876571E-04 | -1.759269E-04 | -1.334079E-02 | -1.041538E-02 | 1.944316E-02 | 2.738608E-02 |
| E | 2.568446E-06 | -1.183391E-05 | -8.182407E-05 | -7.290408E-05 | -1.224081E-05 | -3.211860E-05 | 1.453568E-04 | -3.926737E-04 | 1.893179E-03 | 7.619816E-03 | -1.964213E-03 | -9.024968E-03 |
| F | 1.587583E-06 | 5.852621E-06 | -2.437893E-05 | -5.604112E-05 | -8.779362E-06 | -3.643736E-06 | 5.433920E-06 | -2.955278E-06 | -2.050733E-04 | 1.779741E-04 | | 3.856243E-03 |
| G | -3.401759E-07 | -4.747281E-06 | -1.182279E-06 | -1.823454E-05 | -4.993228E-06 | -2.956731E-06 | 1.055328E-06 | -5.295269E-06 | -7.544981E-05 | -8.391252E-04 | | -1.098259E-03 |
| H | | | | | | | | | | 2.130314E-04 | | 4.834477E-04 |
| J | | | | | | | | | | 2.559913E-04 | | -1.725217E-04 |

FIG. 10

| THIRD EMBODIMENT | RADIUS OF CURVATURE | THICKNESS | REFRACTIVE INDEX | ABBE NUMBER | EFFECTIVE RADIUS |
|---|---|---|---|---|---|
| S1 | 1.0227529 | 0.1525 | 1.658 | 21.494 | 0.5790202 |
| S2 | 0.8602674 | 0.0366 | | | 0.5683914 |
| S3 | 0.9388045 | 0.3571588 | 1.5465 | 56.113 | 0.5836058 |
| S4 | -20.90544 | 0.0244 | | | 0.5734 |
| S5 | 3.4921474 | 0.1525 | 1.658 | 21.494 | 0.5761108 |
| S6 | 1.6914251 | 0.2939121 | | | 0.5734 |
| S7 | -3.423188 | 0.2363621 | 1.658 | 21.494 | 0.613884 |
| S8 | -3.751821 | 0.15 | | | 0.7760602 |
| S9 | -2.592126 | 0.4575071 | 1.5465 | 56.113 | 0.9126282 |
| S10 | -0.898829 | 0.162198 | | | 1.1109575 |
| S11 | 6.52586 | 0.3975625 | 1.536 | 55.656 | 1.5596242 |
| S12 | 0.8116125 | 0.3 | | | 1.863238 |
| S13 | Infinity | 0.11 | | | 2.1319737 |
| S14 | Infinity | | | | 2.1675419 |
| Image | Infinity | | | | 2.3907066 |

FIG. 14

| | S1 | S2 | S3 | S4 | S5 | S6 | S7 | S8 | S9 | S10 | S11 | S12 |
|---|---|---|---|---|---|---|---|---|---|---|---|---|
| K | -1.311627.E+00 | -1.154753.E+00 | -1.335532.E+00 | -7.498105.E+00 | 2.279365.E+01 | 7.558111.E+01 | 4.993409.E+00 | 1.885017.E+00 | 6.045887.E+01 | -5.313654.E-01 | -7.916083.E+00 | -5.298837.E+00 |
| A | -9.452478.E-03 | -1.704487.E-02 | 8.147294.E-03 | -7.322646.E-03 | -1.463816.E-03 | 6.464833.E-02 | -6.572203.E-03 | -7.519611.E-02 | 1.045146.E-01 | 6.143458.E-01 | -5.849955.E-01 | -9.164007.E-01 |
| B | -1.390975.E-03 | -1.420724.E-03 | 3.765408.E-04 | 1.470586.E-04 | 2.255880.E-03 | 4.653389.E-03 | -3.020847.E-03 | 1.460872.E-04 | 4.229309.E-02 | 3.049938.E-02 | 2.112957.E-01 | 1.209589.E-01 |
| C | -1.669653.E-04 | -2.323335.E-04 | -2.076117.E-04 | -4.041267.E-04 | -3.111869.E-04 | 2.238319.E-04 | 5.016664.E-04 | 3.837969.E-03 | -2.928309.E-03 | -2.234358.E-03 | -6.030237.E-03 | -4.341267.E-02 |
| D | -1.253237.E-05 | -5.659943.E-05 | -9.959777.E-05 | 1.823241.E-05 | 7.028213.E-06 | 8.437151.E-06 | 6.838174.E-05 | -1.324056.E-05 | -9.568093.E-04 | -8.170705.E-03 | 1.208499.E-03 | 1.752064.E-02 |
| E | 3.287662.E-06 | 1.197816.E-05 | -2.163383.E-05 | 3.030212.E-05 | -3.408921.E-05 | -1.791220.E-05 | 1.242928.E-06 | -1.630426.E-04 | -1.017905.E-04 | 3.863707.E-03 | -1.285692.E-03 | -5.541247.E-03 |
| F | 5.127783.E-07 | 9.361002.E-07 | -2.810837.E-07 | -1.652625.E-06 | 3.168473.E-07 | -2.540356.E-06 | -9.898348.E-06 | -1.193091.E-04 | -1.911940.E-03 | 4.214924.E-06 | | 2.448652.E-03 |
| G | 2.938507.E-07 | -2.787641.E-07 | -2.844031.E-07 | 5.253262.E-06 | 1.731986.E-07 | -2.768928.E-07 | -7.261818.E-06 | -3.453405.E-05 | -7.428869.E-04 | -2.992890.E-04 | | -6.987616.E-04 |
| H | | | | | | | | | | 1.631224.E-04 | | 2.979627.E-04 |
| J | | | | | | | | | | 1.568738.E-04 | | -1.220280.E-04 |

FIG. 15

OPTICAL SYSTEM

CROSS-REFERENCE TO RELATED APPLICATION(S)

This application claims the benefit of Korean Patent Application No. 10-2014-0174342 filed on Dec. 5, 2014 in the Korean Intellectual Property Office, the entire disclosure of which is incorporated herein by reference for all purposes.

BACKGROUND

1. Field

The following description relates to an optical system.

2. Description of Related Art

Recently, mobile communications terminals have been provided with camera modules, enabling image capturing and video calling. In addition, as the levels of functionality of cameras provided in such mobile communications terminals have gradually increased, cameras for use in mobile communications terminals have gradually been required to have higher levels of resolution and higher degrees of performance.

However, since there is a trend for mobile communications terminals to be miniaturized and lightened, there are limitations in manufacturing camera modules having high levels of resolution and high degrees of performance.

In order to address such issues, recently, camera lenses have been formed of plastic which is lighter than glass, and lens modules have been constructed of five or more lenses to achieve high levels of resolution.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, an optical system includes: a first lens having negative refractive power; a second lens; a third lens; a fourth lens; a fifth lens; a sixth lens; and an image sensor configured to convert an image of a subject incident through the first to sixth lenses into electrical signals, wherein the first to sixth lenses are sequentially disposed from an object side of the optical system, and wherein $TTL/(ImgH*2) \leq 0.75$ is satisfied, with TTL being a distance from an object-side surface of the first lens to an image plane of the image sensor and ImgH being half of a diagonal length of the image plane of the image sensor.

The first to third lenses may have positive or negative refractive power in an alternating sequence toward the object side of the optical system.

A gap between the first and second lenses and a gap between the second and third lenses in a paraxial region may be narrower than a gap between lenses, among the third to sixth lenses, in the paraxial region.

$TTL/(ImgH*2) \leq 0.68$ may be satisfied.

$-5 < f1/EFL < -4.6$ may be satisfied, with f1 being a focal length of the first lens and EFL being an entire focal length of the optical system including the first to sixth lenses.

$2.3 < f1/f3 < 2.6$ may be satisfied, with f1 being a focal length of the first lens and f3 being a focal length of the third lens.

$BFL/EFL < 0.31$ may be satisfied, with BFL being a distance from an image-side surface of the sixth lens to the image plane of the image sensor and EFL being an entire focal length of the optical system including the first to sixth lenses.

$0.95 < ER1/ER6 < 1.05$ may be satisfied, with ER1 being an effective radius of the object-side surface of the first lens and ER6 being an effective radius of an image-side surface of the third lens.

$79 < FOV < 83$ may be satisfied, with FOV being a field of view of the optical system.

The object-side surface of the first lens may be convex in a paraxial region.

The second lens may have positive refractive power.

The fifth lens may have positive refractive power.

The sixth lens may have negative refractive power.

The sixth lens may have at least one inflection point on at least one of an object-side surface or an image-side surface thereof.

According to another general aspect, an optical system includes: a first lens; a second lens; a third lens; a fourth lens; a fifth lens; and a sixth lens, wherein the first to sixth lenses are sequentially disposed from an object side, and wherein a sum of a gap between the first and second lenses and a gap between the second and third lenses in a paraxial region is less than a gap between lenses, among the third to sixth lenses, in the paraxial region.

The second lens may have positive refractive power, and the third lens may have negative refractive power.

The second lens may have positive refractive power; and $|r4/r3|>20$ may be satisfied, with r3 being a radius of curvature of an object-side surface of the second lens and r4 being a radius of curvature of an image-side surface of the second lens.

According to another general aspect, an optical system includes: a first lens having negative refractive power; a second lens; a third lens having negative refractive power; a fourth lens having a meniscus shape of which an image-side surface is convex in a paraxial region; a fifth lens having a meniscus shape of which an image-side surface is convex in the paraxial region; and a sixth lens, wherein the first to sixth lenses are sequentially disposed from an object side, and wherein a gap between the first and second lenses in the paraxial region and a gap between the second and third lenses in the paraxial region are narrower than a gap between lenses, among the third to sixth lenses, in the paraxial region.

According to another general aspect, an optical system includes: lenses arranged from an object side to an image side, and including a first lens having negative refractive power, a second lens, a third lens having negative refractive power; and an image sensor configured to convert an image of a subject incident through the lenses into electrical signals, wherein $-5 < f1/EFL < -4.6$ is satisfied, with f1 being a focal length of the first lens and EFL being an entire focal length of the optical system.

$2.3 < f1/f3 < 2.6$ may be satisfied, with f3 being a focal length of the third lens.

$TTL/(ImgH*2) \leq 0.75$ may be satisfied, with TTL being a distance from an object-side surface of the first lens to an image plane of the image sensor and ImgH being half of a diagonal length of the image plane of the image sensor.

$79 < FOV < 83$ may be satisfied, with FOV being a field of view of the optical system.

According to another general aspect, an optical system includes lenses, the lenses including: a first lens; a second lens disposed further from an object side of the optical system than the first lens; a third lens disposed further from the object side of the optical system than the second lens; and other lenses disposed further from the object side of the optical system than the third lens, wherein at least one of a gap between the first and second lenses and a gap between the second and third lenses in a paraxial region is narrower than gaps between lenses, among the third lens and the other lenses, in the paraxial region.

The optical image system may further include an image sensor configured to convert an image of a subject incident through the lenses into electrical signals, wherein: the other lenses include a fourth lens, a fifth lens disposed further from the object side of the optical system than the fourth lens, and a sixth lens disposed further from the object side of the optical system than the fifth lens; and BFL/EFL<0.31 is satisfied, with BFL being a distance from an image-side surface of the sixth lens to an image plane of the image sensor and EFL being an entire focal length of the optical system including the first to sixth lenses.

TTL/(ImgH*2)≤0.75 may be satisfied, with TTL being a distance from an object-side surface of the first lens to an image plane of the image sensor and ImgH being half of a diagonal length of the image plane of the image sensor.

79<FOV<83 may be satisfied, with FOV being a field of view of the optical system.

Other features and aspects will be apparent from the following detailed description, the drawings, and the claims.

BRIEF DESCRIPTION OF THE DRAWINGS

FIG. 4 is a table representing example respective characteristics of lenses in the optical system illustrated in FIG. 1.

FIG. 5 is a table representing example respective aspheric coefficients of the lenses in the optical system illustrated in FIG. 1.

FIG. 9 is a table representing example respective characteristics of lenses in the optical system illustrated in FIG. 6.

FIG. 10 is a table representing example respective aspheric coefficients of the lenses in the optical system illustrated in FIG. 6.

FIG. 14 is a table representing example respective characteristics of lenses in the optical system illustrated in FIG. 11.

FIG. 15 is a table illustrating example respective aspheric coefficients of the lenses in the optical system illustrated in FIG. 11.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
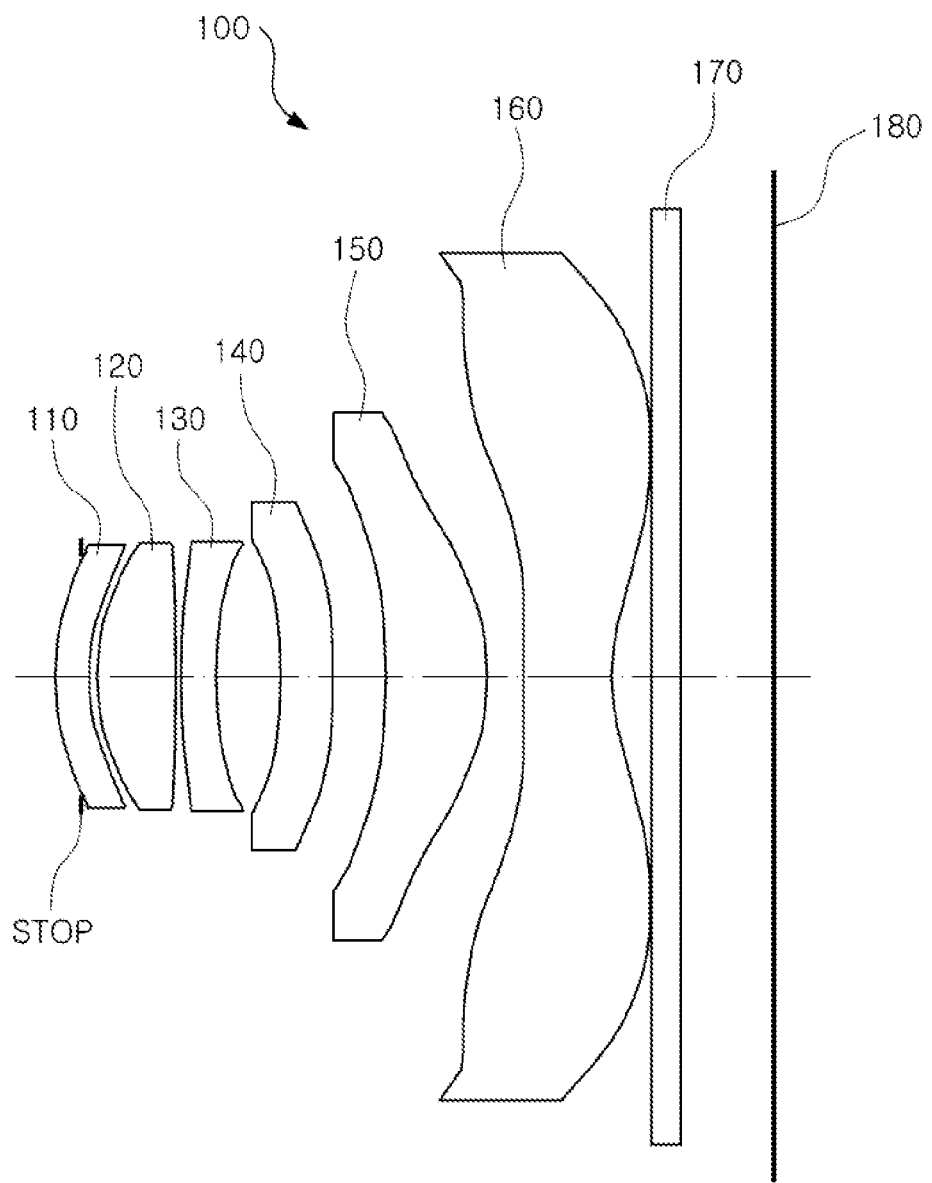
FIG. 1 is a view of an optical system according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In the following description, a first lens refers to a lens closest to an object, while a sixth lens refers to a lens closest to an image sensor. In addition, a first surface of each lens refers to a surface thereof closest to an object side (or an object-side surface) and a second surface of each lens refers to a surface thereof closest to an image side (or an image-side surface). Further, all numerical values of radii of curvature, thicknesses, and the like, of lenses are expressed in millimeters (mm).

Further, a paraxial region refers to a very narrow region in the vicinity of an optical axis.

In addition, TTL is a distance from an object-side surface of the first lens to an image plane of the image sensor, SL is a distance from a stop limiting an amount of light incident to the optical system that is transmitted to the image plane of the image sensor, ImgH is half of a diagonal length of the image plane of the image sensor, BFL is a distance from an image-side surface of a lens closest to the image side to the image plane of the image sensor, and EFL is an entire focal length of the optical system.

An optical system according to example embodiments may include six lenses, for example. That is, the optical system may include a first lens, a second lens, a third lens, a fourth lens, a fifth lens, and a sixth lens.

However, the optical system is not limited to including only six lenses, and may include other components, if necessary. For example, the optical system may further include a stop configured to control an amount of light transmitted to the image sensor. In addition, the optical system may further include an infrared cut-off filter configured to filter infrared light. Further, the optical system may include an image sensor configured to convert an image of a subject incident thereon into electrical signals. Also, the optical system may further include a gap maintaining member configured to adjust a gap between lenses.

In the optical system according to example embodiments, the first to sixth lenses may be formed of plastic.

In addition, at least one of the first to sixth lenses may have an aspheric surface, and each of the first to sixth lenses may have at least one aspheric surface. That is, at least one of the first and second surfaces of the first to sixth lenses may be aspheric. Here, the aspheric surfaces of the first to sixth lenses may be represented by the following Equation 1:

$$Z = \frac{cY^2}{1+\sqrt{1-(1+K)c^2Y^2}} + AY^4 + \quad \text{[Equation 1]}$$

-continued
$$BY^6 + CY^8 + DY^{10} + EY^{12} + FY^{14} + \dots .$$

In Equation 1, c is a curvature (an inverse of a radius of curvature) at an apex of the lens, K is a conic constant, and Y is a distance from a certain point on the aspheric surface of the lens to an optical axis in a direction perpendicular to the optical axis. Constants A to F are aspheric coefficients. Z is a distance between the point on the aspheric surface at the distance Y and a tangential plane meeting the apex of the aspheric surface of the lens.

The first to sixth lenses may respectively have, in sequential order from the object side, negative refractive power, positive refractive power, negative refractive power, negative refractive power, positive refractive power, and negative refractive power.

The optical system configured as described above may improve optical performance through aberration improvement. Effects by respective configurations of lenses will be described below.

The optical system according to example embodiments may satisfy Conditional Expression 1.

$TTL/(ImgH*2) \leq 0.75$ [Conditional Expression 1]

In Conditional Expression 1, TTL is a distance from the object-side surface of the first lens to the image plane of the image sensor, and ImgH is half of a diagonal length of the image plane of the image sensor.

The optical system according to example embodiments may satisfy Conditional Expression 2.

$TTL/(ImgH*2) \leq 0.68$ [Conditional Expression 2]

The optical system according to example embodiments may satisfy Conditional Expression 3.

$-5 < f1/EFL < -4.6$ [Conditional Expression 3]

In Conditional Expression 3, f1 is a focal length of the first lens, and EFL is an entire focal length of the optical system.

The optical system according to example embodiments may satisfy Conditional Expression 4.

$2.3 < f1/f3 < 2.6$ [Conditional Expression 4]

In Conditional Expression 4, f1 is the focal length of the first lens, and f3 is a focal length of the third lens.

The optical system according to example embodiments may satisfy Conditional Expression 5.

$BFL/EFL < 0.31$ [Conditional Expression 5]

In Conditional Expression 5, BFL is a distance from an image-side surface of the sixth lens to the image plane of the image sensor, and EFL is the entire focal length of the optical system.

The optical system according to example embodiments may satisfy Conditional Expression 6.

$0.95 < ER1/ER6 < 1.05$ [Conditional Expression 6]

In Conditional Expression 6, ER1 is an effective radius of the object-side surface of the first lens, and ER6 is an effective radius of an image-side surface of the third lens.

The optical system according to example embodiments may satisfy Conditional Expression 7.

$79 < FOV < 83$ [Conditional Expression 7]

In Conditional Expression 7, FOV is a field of view of the optical system. Here, the field of view of the optical system is indicated by degrees.

Next, the first to sixth lenses configuring optical systems according to example embodiments will be described.

The first lens may have negative refractive power. In addition, the first lens may have a meniscus shape of which an object-side surface is convex. In detail, a first surface of the first lens may be convex in the paraxial region, and a second surface of the first lens may be concave in the paraxial region.

At least one of the first and second surfaces of the first lens may be aspheric. For example, both surfaces of the first lens may be aspheric.

The second lens may have positive refractive power. In addition, the first and second surfaces of the second lens may be convex. In detail, the first and second surfaces of the second lens may be convex in the paraxial region.

At least one of the first and second surfaces of the second lens may be aspheric. For example, the first and second surfaces of the second lens may be aspheric.

The third lens may have negative refractive power. In addition, the third lens may have a meniscus shape of which an object-side surface is convex. In detail, a first surface of the third lens may be convex in the paraxial region, and a second surface of the third lens may be concave in the paraxial region.

At least one of the first and second surfaces of the third lens may be aspheric. For example, both surfaces of the third lens may be aspheric.

The fourth lens may have negative refractive power. In addition, the fourth lens may have a meniscus shape of which an image-side surface is convex. In detail, a first surface of the fourth lens may be concave in the paraxial region, and a second surface of the fourth lens may be convex in the paraxial region.

At least one of the first and second surfaces of the fourth lens may be aspheric. For example, the first and second surfaces of the fourth lens may be aspheric.

The fifth lens may have positive refractive power. In addition, the fifth lens may have a meniscus shape of which an image-side surface is convex. In detail, a first surface of the fifth lens may be concave in the paraxial region, and a second surface of the fifth lens may be convex in the paraxial region.

At least one of the first and second surfaces of the fifth lens may be aspheric. For example, both surfaces of the fifth lens may be aspheric.

The sixth lens may have negative refractive power. In addition, the sixth lens may have a meniscus shape of which an object-side surface is convex. In detail, a first surface of the sixth lens may be convex in the paraxial region, and a second surface of the sixth lens may be concave in the paraxial region.

In the optical system according to example embodiments, the first lens may have negative refractive power to realize a wide field of view, and the optical system may be designed using retro focus type lenses.

The wider the field of view is, the shorter the focal length is. In this case, a back focus, which is a distance between a lens closest to the image side and the image plane of the image sensor, may be shortened, and it may be difficult to secure a space in which the infrared cut-off filter may be disposed between the lens closest to the image side and the image plane of the image sensor.

Therefore, according to example embodiments, the optical system may be designed using the retro focus type lenses to make the back focus relatively long while realizing a wide field of view, whereby a space in which the infrared cut-off filter may be disposed may be secured between the sixth lens and the image sensor. Here, in order to prevent an increase in an entire length of the optical system due to a relative increase in the back focus, a synthetic focal length of the second and third lenses may be shorter than the entire focal length of the optical system.

The optical system according to example embodiments may easily correct chromatic aberration. Chromatic aberration is generated due to a difference in refractive indices depending on wavelengths, and chromatic aberration is generated because light having a long wavelength is focused on an area more distant from the lens as compared with light having a relatively short wavelength after it passes through the lens. Therefore, in a case in which chromatic aberration is large, light may be diffused depending on wavelengths, and thus, it is necessary to correct the chromatic aberration.

In the optical system according to example embodiments, the first to third lenses may have different refractive powers. For example, the first lens may have negative refractive power, the second lens may have positive refractive power, and the third lens may have negative refractive power. Therefore, the first to third lenses may have positive or negative refractive power in an alternating sequence toward the object side. Since the lenses adjacent to each other have refractive powers opposite to each other, light may diverge in any one of the lenses and converge in the other lenses. Therefore, light having different wavelengths may be collected on the same focus.

In the optical system according to example embodiments, gaps among the first to third lenses may be relatively narrow in order to significantly increase a chromatic aberration correction effect. For example, in the paraxial region, a gap between the first and second lenses and a gap between the second and third lenses may be narrower than a gap between other adjacent lenses. Further still, the gap between the first and second lenses and the gap between the second and third lenses may be narrower than each of the other gaps between lenses among the third to sixth lenses. According to a further embodiment, in the paraxial region, a sum of a gap between the first and second lenses and a gap between the second and third lenses may be narrower than a gap between other adjacent lenses. More specifically, the sum of the gap between the first and second lenses and the gap between the second and third lenses may be narrower than each of the other gaps between lenses among the third to sixth lenses. Therefore, an effect similar to that of a triply bonded lens in which the first to third lenses are bonded to each other may be achieved, and thus the chromatic aberration correction effect may be significantly increased.

In addition, since the gaps among the first to third lenses are narrow, the entire length of the optical system may be decreased. As a result, a slim optical system may be provided.

As described above, the second lens of the optical system, according to example embodiments, may have positive refractive power, and both surfaces thereof may be convex. Here, an absolute value of a radius of curvature of an object-side surface of the second lens may be less than that of a radius of curvature of an image-side surface of the second lens.

For example, when the radius of curvature of the object-side surface of the second lens is r3 and the radius of curvature of the image-side surface of the second lens is r4, |r4/r3|>20 may be satisfied. Therefore, a curvature of the object-side surface of the second lens may be relatively larger than that of the image-side surface of the second lens, and a curvature of the image-side surface of the second lens may be relatively smaller than that of the object-side surface of the second lens. According to the configuration as described above, spherical aberration may be easily corrected.

In the optical system according to example embodiments, the third lens may have the meniscus shape of which the object-side surface is convex, and the fourth and fifth lenses may have the meniscus shape of which the image-side surface is convex. As described above, the shapes of the third and fourth lenses may be symmetrical to each other or the shapes of the third and fifth lenses may be symmetrical to each other, thereby allowing light incident to the optical system to be vertically incident to the image plane of the image sensor. Therefore, in the optical system according to example embodiments, a difference between brightness of an image at a central portion of an image sensor and brightness of an image at edge portions of the image sensor may be decreased. Therefore, a lens shading phenomenon in which the image at the edge portions of the image sensor is relatively dark may be alleviated.

An optical system 100 according to a first example embodiment will be described with reference to FIGS. 1 through 5. The optical system 100 includes a first lens 110, a second lens 120, a third lens 130, a fourth lens 140, a fifth lens 150, and a sixth lens 160, and further includes a stop (STOP), an infrared cut-off filter 170, and an image sensor 180.

Respective characteristics (radii of curvature, thicknesses, refractive indices, and Abbe numbers) of lenses 110 to 160 and the infrared cut-off filter 170 are illustrated in FIG. 4. In FIG. 4, Surfaces S1 and S2 indicate the first surface (object-side surface) and the second surface (image-side surface), respectively, of the first lens 110, and Surfaces S3 and S4 indicate the first and second surfaces, respectively, of the second lens 120. Similarly, Surfaces S5 to S12 indicate the first and second surfaces of the third to sixth lenses 130-160, respectively. In addition, Surfaces S13 and S14 indicate first and second surfaces, respectively, of the infrared cut-off filter 170.

The first lens 110 has negative refractive power and has a meniscus shape of which an object-side surface is convex. For example, a first surface of the first lens 110 is convex in the paraxial region, and a second surface of the first lens 110 is concave in the paraxial region.

The second lens 120 has positive refractive power and has a meniscus shape of which first and second surfaces are convex. For example, first and second surfaces of the second lens 120 are convex in the paraxial region.

The third lens 130 has negative refractive power and has a meniscus shape of which an object-side surface is convex. For example, a first surface of the third lens 130 is convex in the paraxial region, and a second surface of the third lens 130 is concave in the paraxial region.

The fourth lens 140 has negative refractive power and has a meniscus shape of which an image-side surface is convex. For example, a first surface of the fourth lens 140 is concave in the paraxial region, and a second surface of the fourth lens 140 is convex in the paraxial region.

The fifth lens 150 has positive refractive power and has a meniscus shape in which it is convex toward the image. For example, a first surface of the fifth lens 150 is concave in the paraxial region, and a second surface of the fifth lens 150 is convex in the paraxial region.

The sixth lens 160 has negative refractive power and has a meniscus shape of which an object-side surface is convex. For example, a first surface of the sixth lens 160 is convex in the paraxial region, and a second surface of the sixth lens 160 is concave in the paraxial region. In addition, the sixth lens 160 has at least one inflection point formed on at least one of the first or second surfaces thereof.

By way of example, the respective surfaces of the first to sixth lenses 110 to 160 have aspheric coefficients as illustrated in FIG. 5.

The stop includes, for example, a first stop configured to limit an amount of light incident to the optical system that is transmitted through the first lens 110 and a second stop configured to block light at a portion at which excessive aberration is generated. The first stop is disposed in front of the object-side surface of the first lens 110, and the second stop is disposed among the first to fourth lenses 110 to 140.

Figure 2:
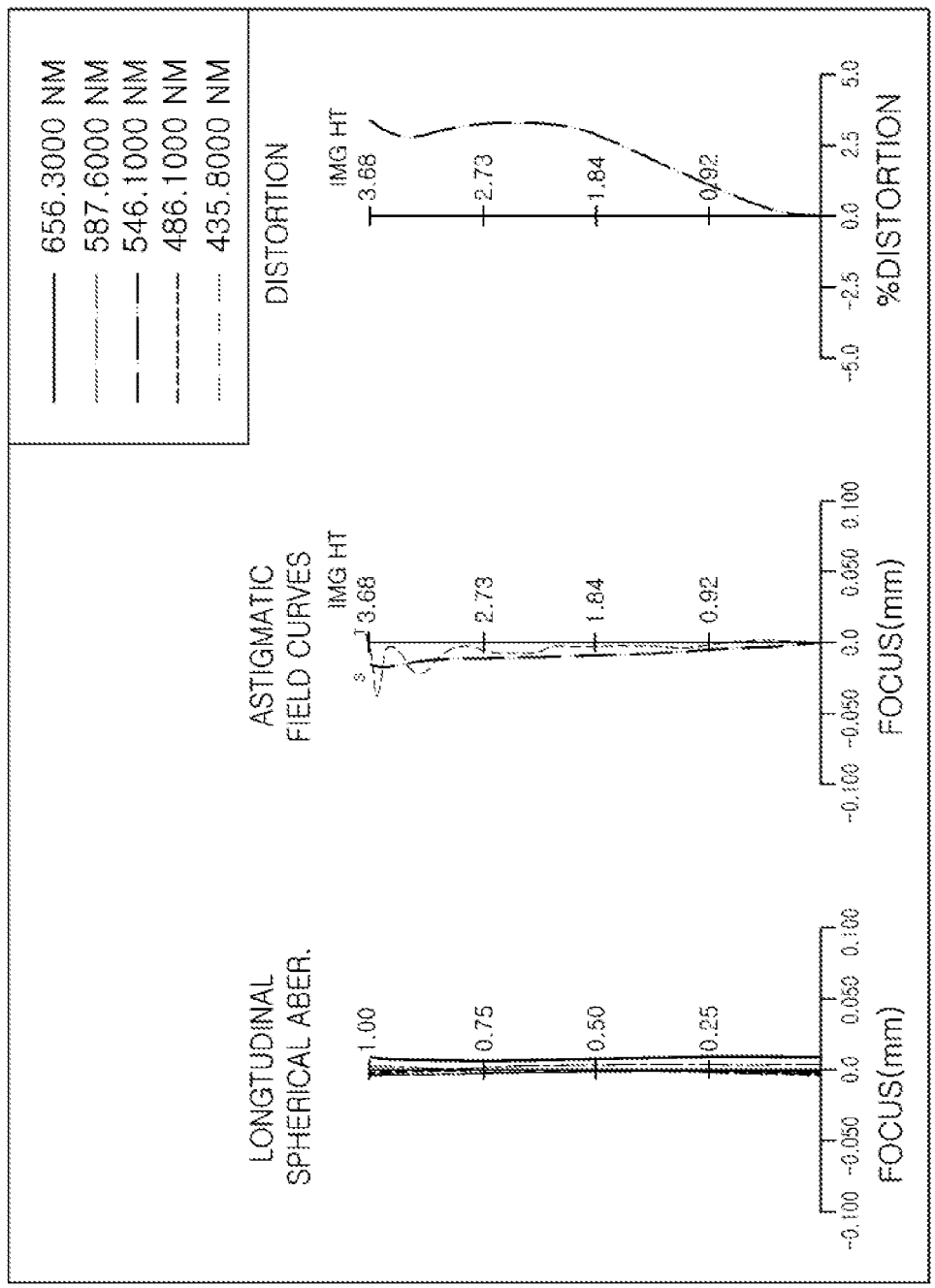
FIGS. 2 and 3 are graphs having curves representing example aberration characteristics of the optical system illustrated in FIG. 1.
Figure 3:
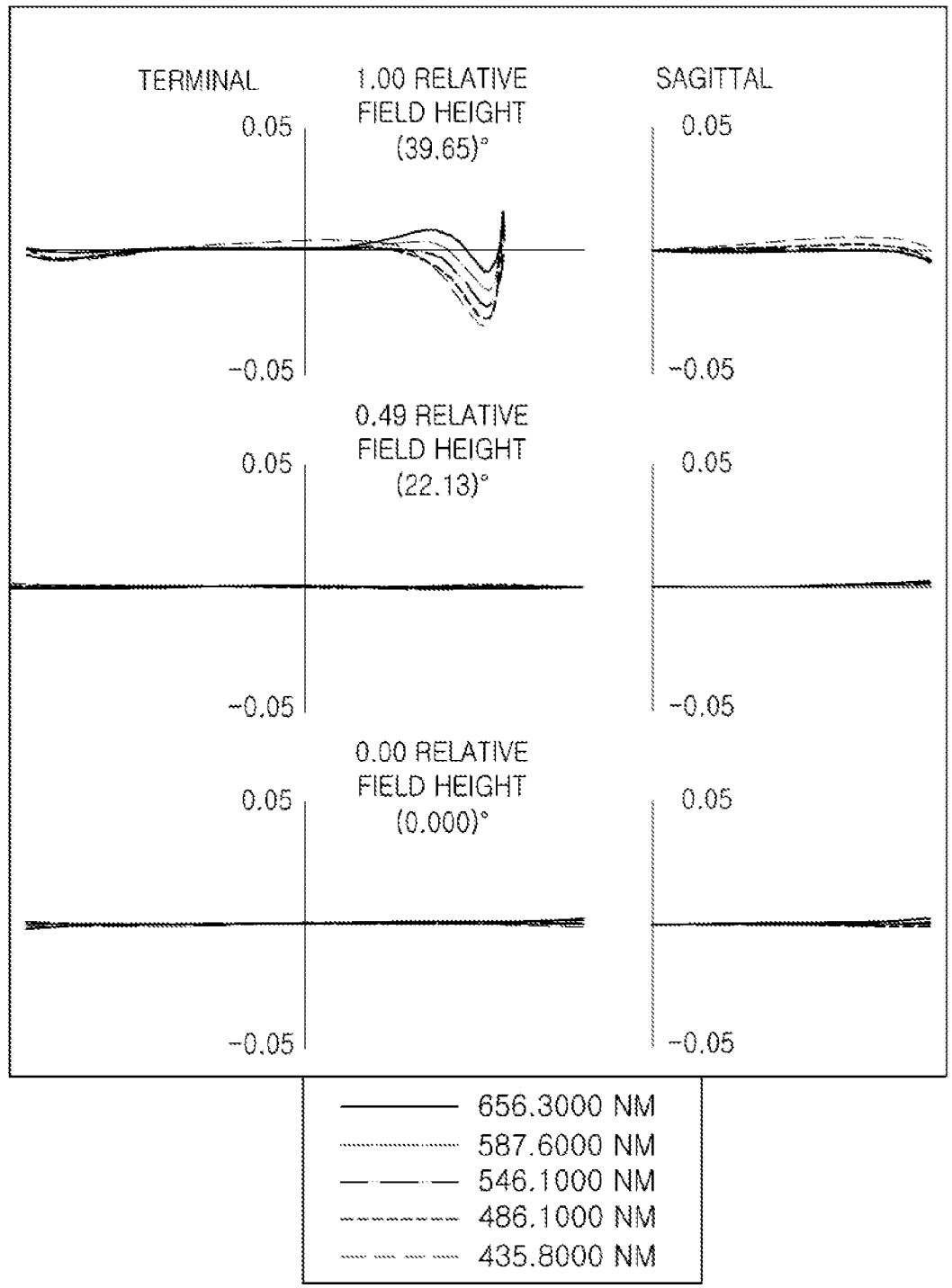
Figure 6:
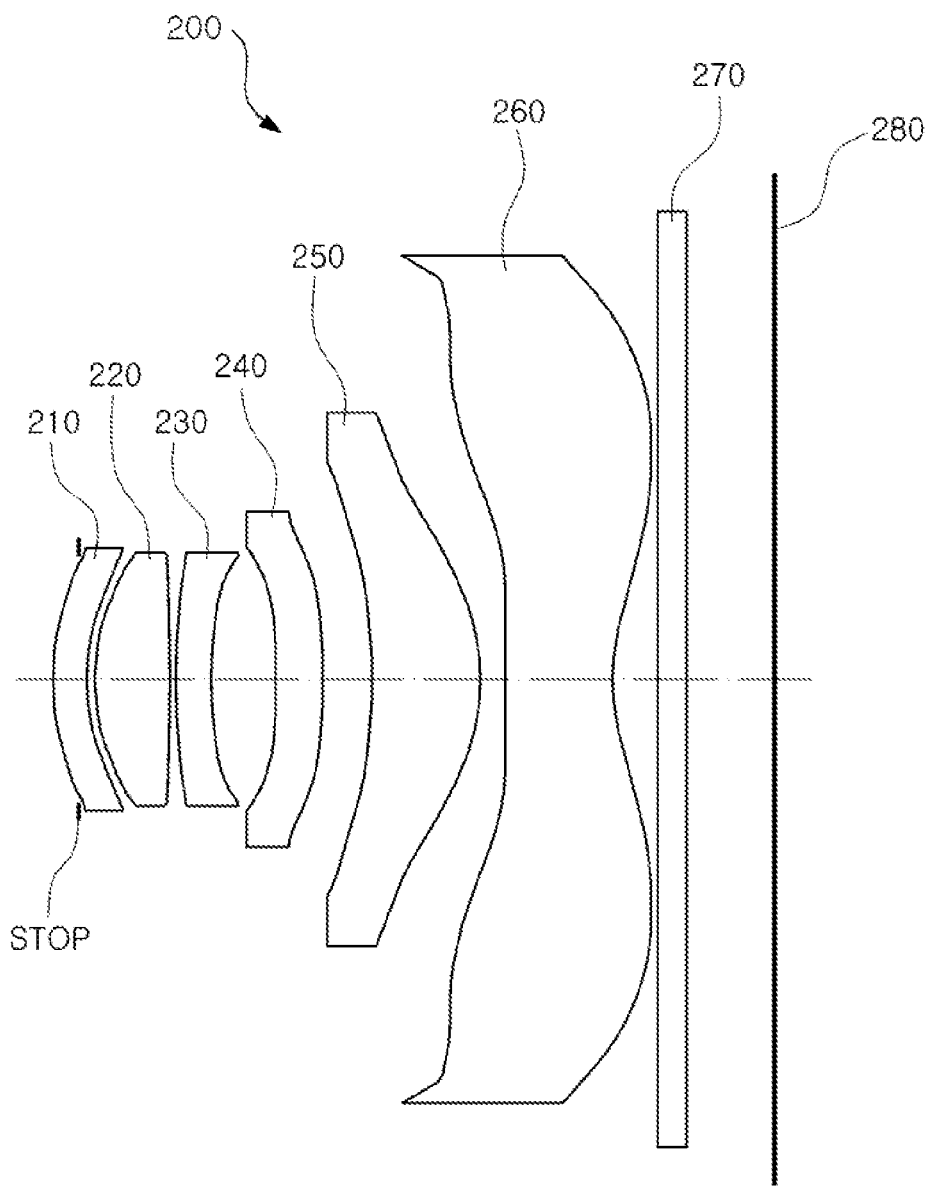
FIG. 6 is a view of an optical system according to another example.

In addition, by way of example, the optical system 100 has aberration characteristics as illustrated in FIGS. 2 and 3.

An optical system 200 according to a second example embodiment will be described with reference to FIGS. 6 through 10. The optical system 200 includes a first lens 210, a second lens 220, a third lens 230, a fourth lens 240, a fifth lens 250, and a sixth lens 260, and further includes the stop (STOP), an infrared cut-off filter 270, and an image sensor 280.

Respective characteristics (radii of curvature, thicknesses, refractive indices, and Abbe numbers) of lenses 210 to 260 and the infrared cut-off filter 270 are illustrated in FIG. 9. In FIG. 9, Surfaces S1 and S2 indicate the first surface (object-side surface) and the second surface (image-side surface), respectively, of the first lens 210, and Surfaces S3 and S4 indicate the first and second surfaces, respectively, of the second lens 220. Similarly, Surfaces S5 to S12 indicate the first and second surfaces of the third to sixth lenses 230-260, respectively. In addition, Surfaces S13 and S14 indicate first and second surfaces, respectively, of the infrared cut-off filter 270.

The first lens 210 has negative refractive power and has a meniscus shape of which an object-side surface is convex. For example, a first surface of the first lens 210 is convex in the paraxial region, and a second surface of the first lens 210 is concave in the paraxial region.

The second lens 220 has positive refractive power and has a meniscus shape of which first and second surfaces are convex. For example, the first and second surfaces of the second lens 220 are convex in the paraxial region.

The third lens 230 has negative refractive power and has a meniscus shape of which an object-side surface is convex. For example, a first surface of the third lens 230 is convex in the paraxial region, and a second surface of the third lens 230 is concave in the paraxial region.

The fourth lens 240 has negative refractive power and has a meniscus shape of which an image-side surface is convex. For example, a first surface of the fourth lens 240 is concave in the paraxial region, and a second surface of the fourth lens 140 is convex in the paraxial region.

The fifth lens 150 has positive refractive power and has a meniscus shape in which it is convex toward the image. For example, a first surface of the fifth lens 150 is concave in the paraxial region, and a second surface of the fifth lens 250 is convex in the paraxial region.

The sixth lens 260 has negative refractive power and has a meniscus shape of which an object-side surface is convex. For example, a first surface of the sixth lens 260 is convex in the paraxial region, and a second surface of the sixth lens 260 is concave in the paraxial region. In addition, the sixth lens 260 has at least one inflection point formed on at least one of the first or second surfaces thereof.

By way of example, the respective surfaces of the first to sixth lenses 210 to 260 have aspheric coefficients as illustrated in FIG. 10.

The stop includes, for example, a first stop configured to limit an amount of light incident to the optical system that is transmitted through the first lens 210 and a second stop configured to block light at a portion at which excessive aberration is generated. For example, the first stop is disposed in front of the object-side surface of the first lens 210, and the second stop is disposed among the first to fourth lenses 210 to 240.

Figure 7:
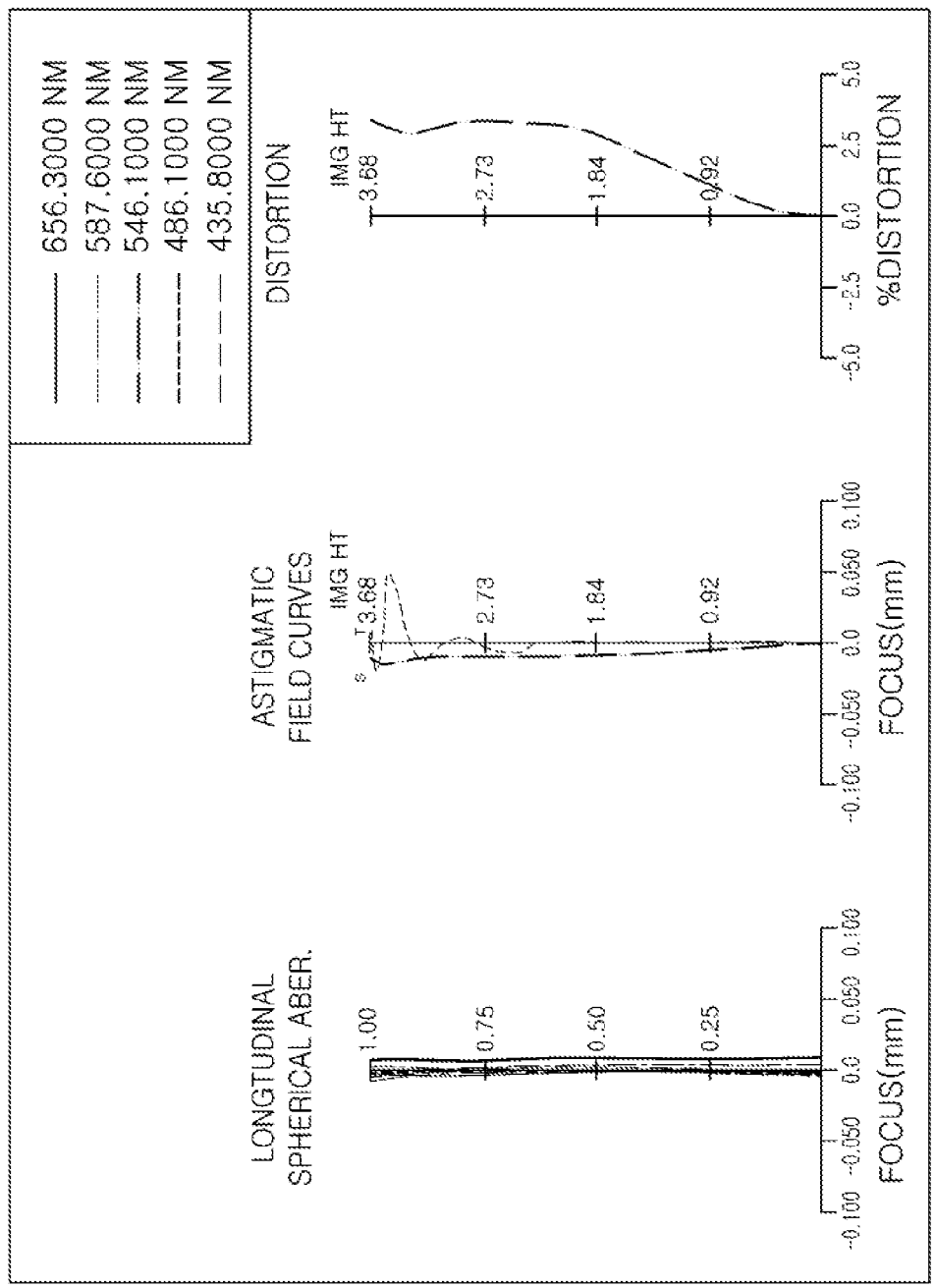
FIGS. 7 and 8 are graphs having curves representing example aberration characteristics of the optical system illustrated in FIG. 6.
Figure 8:
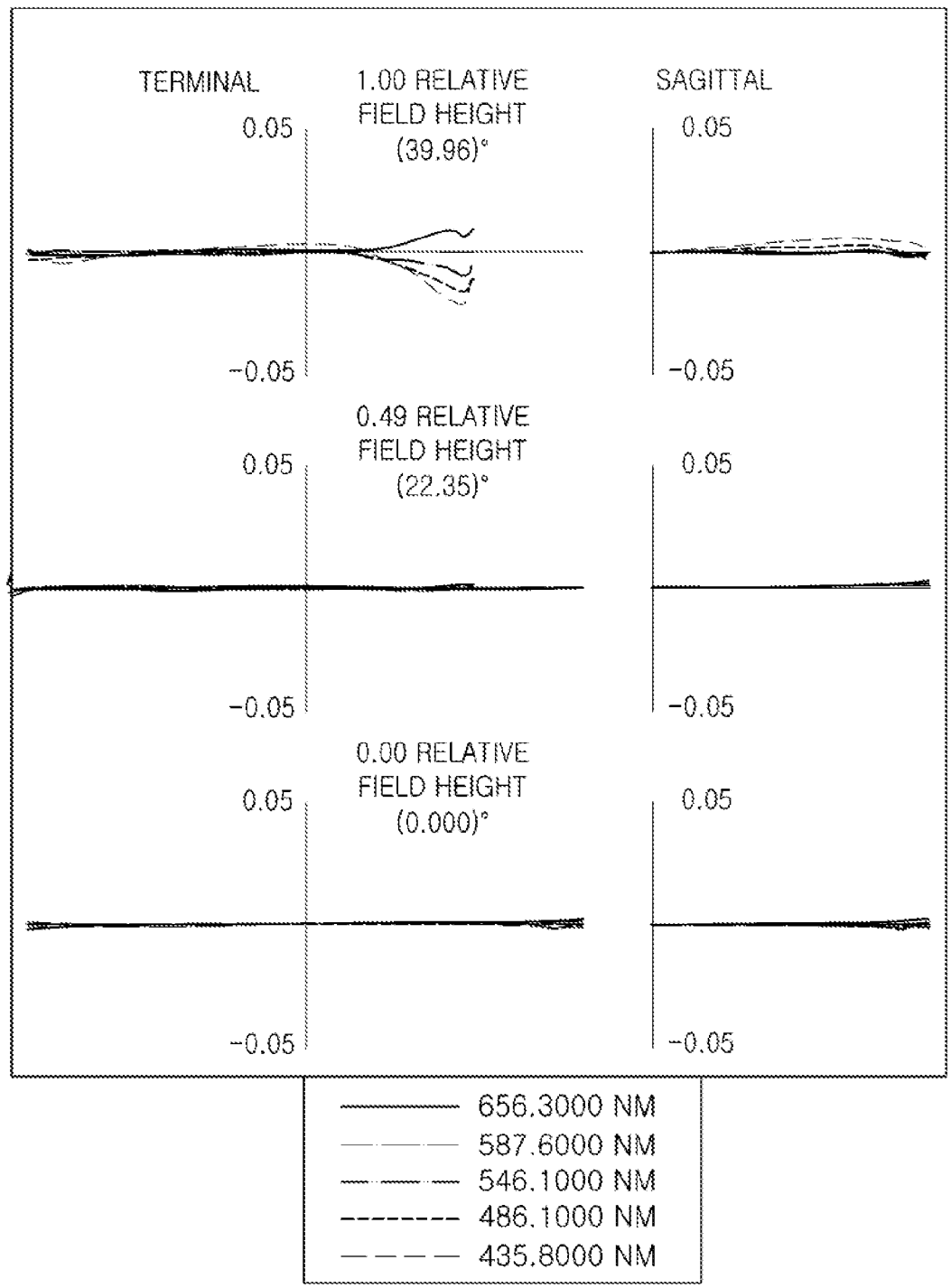
Figure 11:
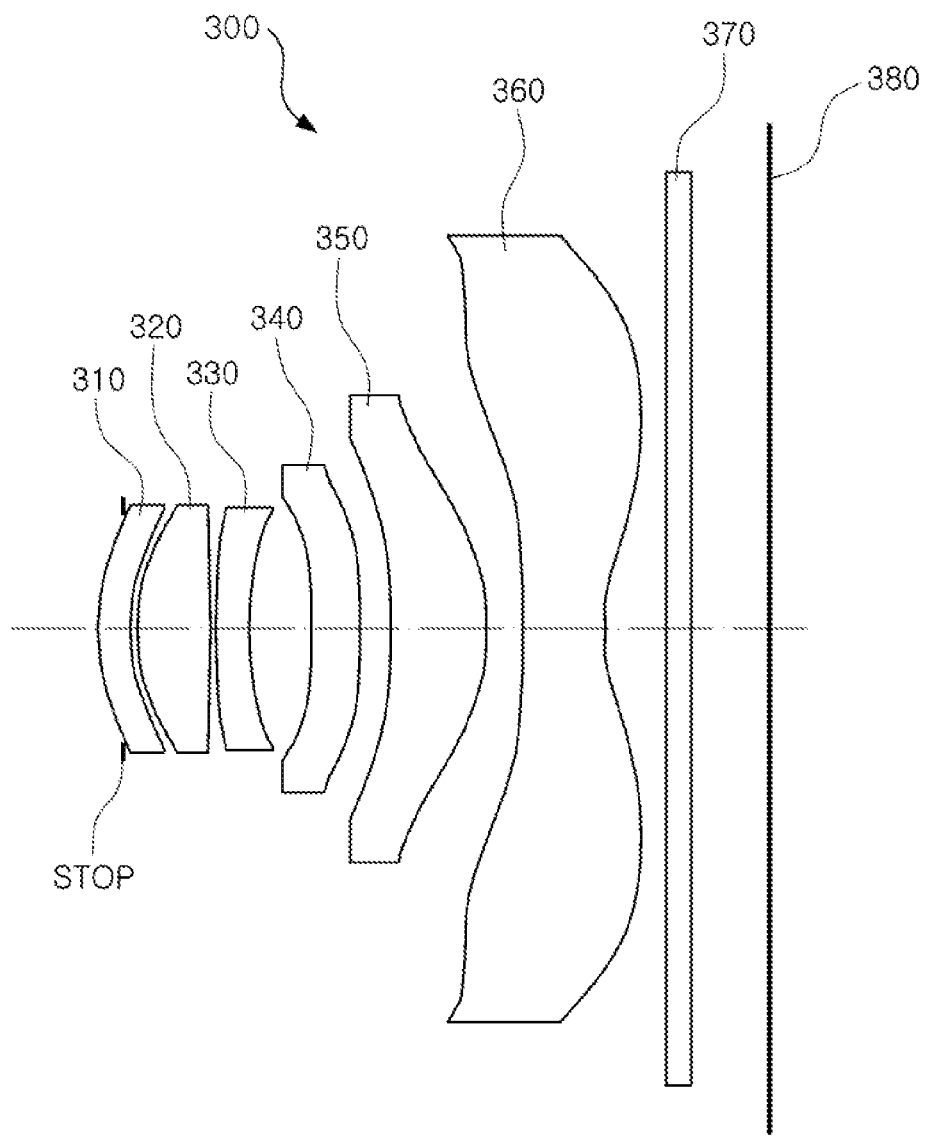
FIG. 11 is a view of an optical system according to another example.

In addition, by way of example, the optical system 200 has aberration characteristics as illustrated in FIGS. 7 and 8.

An optical system 300 according to a third example embodiment will be described with reference to FIGS. 11 through 15. The optical system 300 includes a first lens 310, a second lens 320, a third lens 330, a fourth lens 340, a fifth lens 350, and a sixth lens 360, and further includes the stop (STOP), an infrared cut-off filter 370, and an image sensor 380.

Respective characteristics (radii of curvature, thicknesses, refractive indices, and Abbe numbers) of lenses 310 to 360 and the infrared cut-off filter 370 are illustrated in FIG. 14. In FIG. 14, Surfaces S1 and S2 indicate the first surface (object-side surface) and the second surface (image-side surface), respectively, of the first lens 310, and Surfaces S3 and S4 indicate the first and second surfaces, respectively, of the second lens 320. Similarly, Surfaces S5 to S12 indicate the first and second surfaces of the third to sixth lenses 330-360, respectively. In addition, Surfaces S13 and S14 indicate first and second surfaces, respectively, of the infrared cut-off filter 370.

The first lens 310 has negative refractive power and has a meniscus shape of which an image-side surface is convex. For example, a first surface of the first lens 310 is convex in the paraxial region, and a second surface of the first lens 310 is concave in the paraxial region.

The second lens 320 has positive refractive power and has a meniscus shape of which first and second surfaces are convex. For example, the first and second surfaces of the second lens 320 may be convex in the paraxial region.

The third lens 330 has negative refractive power and has a meniscus shape of which an object-side surface is convex. For example, a first surface of the third lens 330 is convex in the paraxial region, and a second surface of the third lens 330 is concave in the paraxial region.

The fourth lens 340 has negative refractive power and has a meniscus shape of which an image-side surface is convex. For example, a first surface of the fourth lens 340 is concave in the paraxial region, and a second surface of the fourth lens 340 is convex in the paraxial region.

The fifth lens 350 has positive refractive power and has a meniscus shape in which it is convex toward the image. For example, a first surface of the fifth lens 350 is concave in the paraxial region, and a second surface of the fifth lens is convex in the paraxial region.

The sixth lens 360 has negative refractive power and has a meniscus shape of which an object-side surface is convex. For example, a first surface of the sixth lens 360 is convex in the paraxial region, and a second surface of the sixth lens 360 is concave in the paraxial region. In addition, the sixth lens 360 has at least one inflection point formed on at least one of the first or second surfaces thereof. By way of example, the respective surfaces of the first to sixth lenses 310 to 360 have aspheric coefficients as illustrated in FIG. 15.

The stop includes, for example, a first stop configured to limit an amount of light incident to the optical system that is transmitted through the first lens 310 and a second stop configured to block light at a portion at which excessive aberration is generated. For example, the first stop is disposed in front of the object-side surface of the first lens 310, and the second stop is disposed among the first to fourth lenses 310 to 340.

Figure 12:
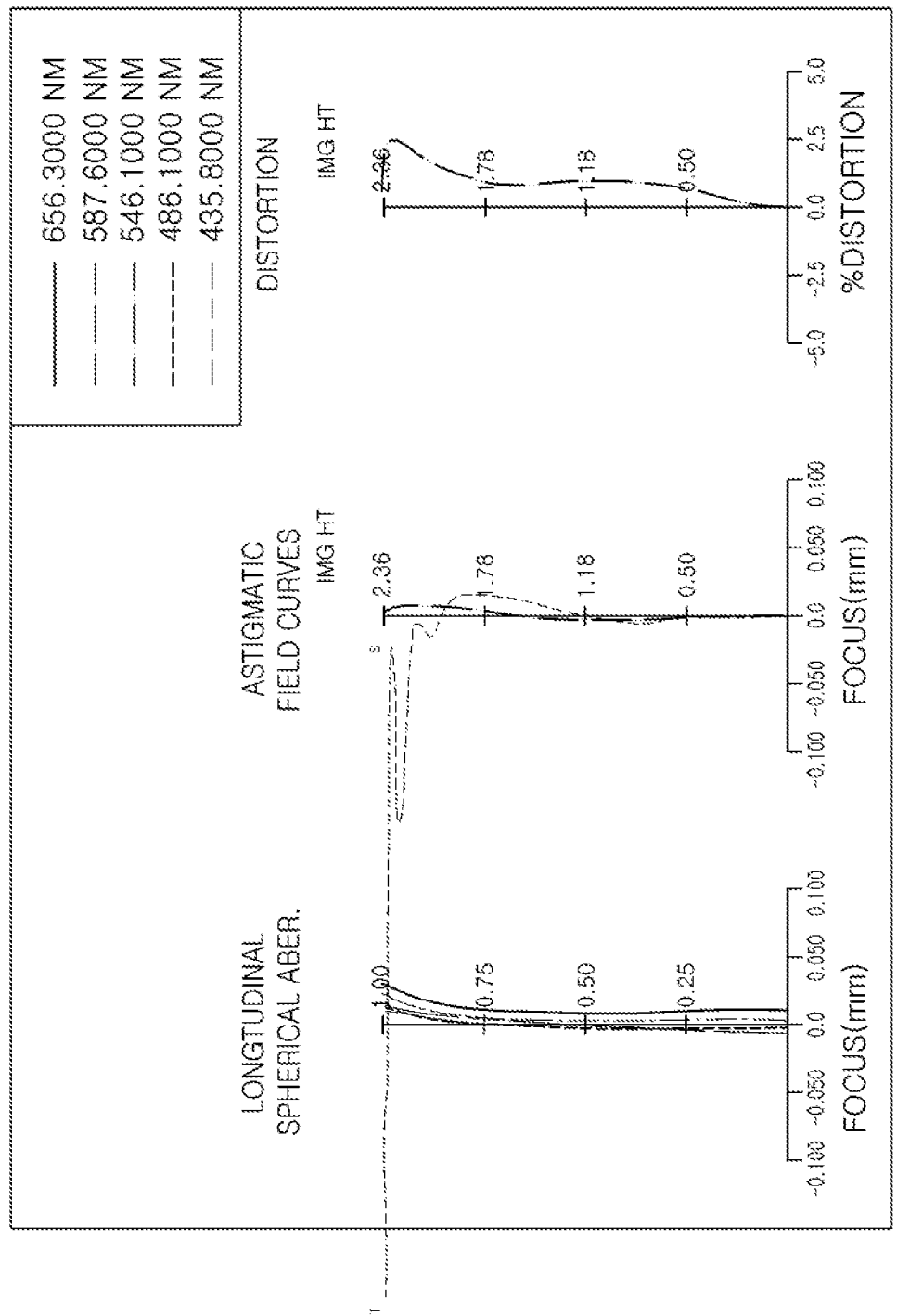
FIGS. 12 and 13 are graphs having curves representing example aberration characteristics of the optical system illustrated in FIG. 11.
Figure 13:
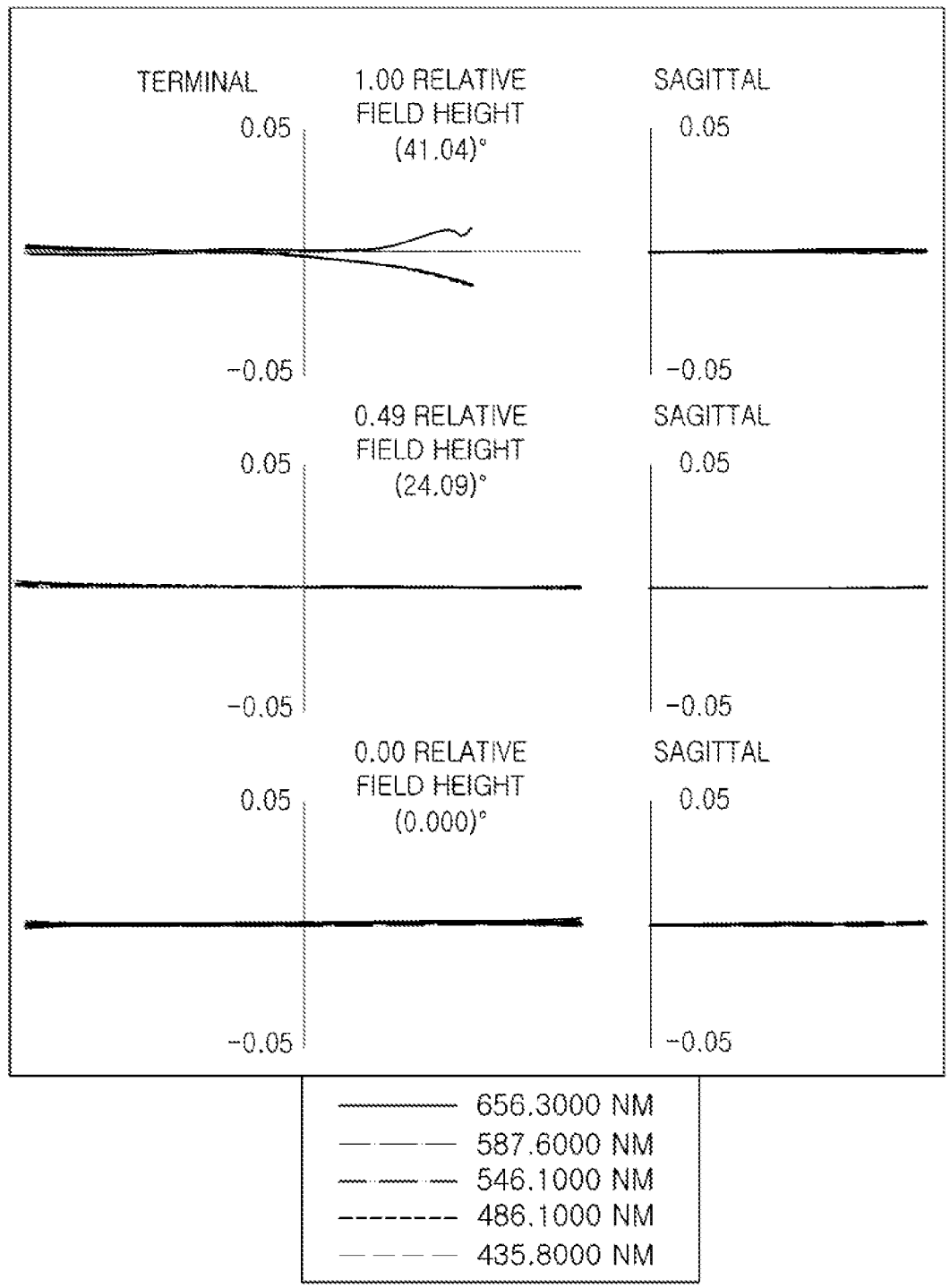

In addition, by way of example, the optical system 300 has aberration characteristics as illustrated in FIGS. 12 and 13.

It can be appreciated from Table 1 that the optical systems 100 to 300 satisfy Conditional Expressions 1 to 7 described above. Therefore, optical performance of the lenses may be improved, and the optical system may be provided with a wide field of view and a slim construction.

TABLE 1

|  | Optical System 100 | Optical System 200 | Optical System 300 |
|---|---|---|---|
| TTL | 5.30 | 5.30 | 3.21 |
| SL | 5.06 | 5.05 | 3.06 |
| EFL | 4.35 | 4.30 | 2.66 |
| BFL | 1.19 | 1.19 | 0.79 |
| f1 | −21.50 | −20.08 | −13.11 |
| f3 | −8.46 | −8.46 | −5.16 |
| IMGH | 3.68 | 3.68 | 2.39 |
| FOV | 79.30 | 79.93 | 82.07 |
| TTL/(IMGH*2) | 0.72 | 0.72 | 0.67 |
| f1/EFL | −4.94 | −4.67 | −4.92 |
| f1/f3 | 2.54 | 2.37 | 2.54 |
| BFL/EFL | 0.27 | 0.28 | 0.30 |
| ER1/ER6 | 0.9788527 | 1.0366283 | 1.0098015 |

As set forth above, according to example embodiments, an optical system having a wide field of view and a slim construction may be provided. In addition, an aberration improvement effect may be increased, and high resolution may be achieved. Further, a difference between brightness of an image at a central portion of the image sensor and brightness of an image at edge portions of the image sensor may be decreased.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical system comprising:
   a first lens having negative refractive power;
   a second lens;
   a third lens having a concave image-side surface;
   a fourth lens;
   a fifth lens;
   a sixth lens; and
   an image sensor configured to convert an image of a subject incident through the first to sixth lenses into electrical signals,
   wherein the optical system comprises a total of six lenses,
   wherein the first to sixth lenses are sequentially disposed from an object side of the optical system, and
   wherein TTL/(ImgH*2)≤0.75 is satisfied, with TTL being a distance from an object-side surface of the first lens to an image plane of the image sensor and ImgH being half of a diagonal length of the image plane of the image sensor, and
   wherein −5<f1/EFL<−4.6 is satisfied, with f1 being a focal length of the first lens and EFL being an entire focal length of the optical system including the first to sixth lenses.

2. The optical system of claim 1, wherein the second lens has positive refractive power, and the third lens has negative refractive power.

3. The optical system of claim 2, wherein each of a gap between the first lens and the second lens and a gap between the second lens and the third lens in a paraxial region are narrower than each one of a gap between the third lens and the fourth lens, a gap between the fourth lens and the fifth lens, and a gap between the fifth lens and the sixth lens, in the paraxial region.

4. The optical system of claim 1, wherein TTL/(ImgH*2)≤0.68 is satisfied.

5. An optical system comprising:
   a first lens having negative refractive power;
   a second lens;
   a third lens having a concave image-side surface;
   a fourth lens;
   a fifth lens;
   a sixth lens; and
   an image sensor configured to convert an image of a subject incident through the first to sixth lenses into electrical signals,
   wherein the optical system comprises a total of sex lenses,
   wherein the first to sixth lenses are sequentially disposed from an object side of the optical system,
   wherein TTL/(ImgH*2)≤0.75 is satisfied, with TTL being a distance from an object-side surface of the first lens to an image plane of the image sensor and ImgH being half of a diagonal length of the image plane of the image sensor, and
   wherein 2.3<f1/f3<2.6 is satisfied, wherein f1 is a focal length of the first lens and f3 is a focal length of the third lens.

6. The optical system of claim 1, wherein BFL/EFL<0.31 is satisfied, with BFL being a distance from an image-side surface of the sixth lens to the image plane of the image sensor and EFL being an entire focal length of the optical system including the first to sixth lenses.

7. The optical system of claim 1, wherein 0.95<ER1/ER6<1.05 is satisfied, with ER1 being an effective radius of the object-side surface of the first lens and ER6 being an effective radius of an image-side surface of the third lens.

8. The optical system of claim 1, wherein 79 degrees<FOV<83 degrees is satisfied, with FOV being a field of view of the optical system.

9. The optical system of claim 1, wherein the object-side surface of the first lens is convex in a paraxial region.

10. The optical system of claim 1, wherein the second lens comprises positive refractive power.

11. The optical system of claim 1, wherein the fifth lens comprises positive refractive power.

12. The optical system of claim 1, wherein the sixth lens comprises negative refractive power.

13. The optical system of claim 1, wherein the sixth lens comprises at least one inflection point on at least one of an object-side surface or an image-side surface thereof.

* * * * *